United States Patent [19]

Ogino

[11] Patent Number: 4,718,735
[45] Date of Patent: Jan. 12, 1988

[54] SYSTEM FOR CONTROLLING MOTOR VEHICLE DRIVING FORCE

[75] Inventor: Kinji Ogino, Saitama, Japan

[73] Assignees: Akebono Brake Industry Co., Ltd., Tokyo; Akebono Research and Development Centre Ltd., Saitama; both of Japan

[21] Appl. No.: 939,729

[22] Filed: Dec. 9, 1986

[30] Foreign Application Priority Data

Dec. 10, 1985 [JP] Japan .................................. 60-277421

[51] Int. Cl.$^4$ .............................................. B60T 8/08
[52] U.S. Cl. ...................................... 303/93; 303/98; 303/103
[58] Field of Search ........................ 303/93, 94, 95, 96, 303/97, 98, 99, 102, 103, 109; 364/420; 180/197, 219

[56] References Cited

U.S. PATENT DOCUMENTS

| | | | |
|---|---|---|---|
| 4,180,223 | 12/1979 | Amberg | 303/93 |
| 4,308,583 | 12/1981 | Musolino et al. | 303/93 |
| 4,327,413 | 4/1982 | Rouf | 303/93 X |
| 4,358,164 | 11/1982 | Bleckmann et al. | 303/93 |
| 4,554,990 | 11/1985 | Kamiya et al. | 303/96 |

Primary Examiner—Duane A. Reger
Assistant Examiner—Matthew C. Graham
Attorney, Agent, or Firm—Finnegan, Henderson, Farabow, Garrett and Dunner

[57] ABSTRACT

A system for controlling motor vehicle driving force comprises means for detecting the rotational speed of each of the driving wheels and a driven wheel, means for controlling brake means for the driving wheels according to the output of the detecting means, first comparing means for comparing the rotational speed of the driving wheels with the rotational speed of the driven wheel, calculating means for determining a slipping ratio corresponding to the ratio of the rotational speed of the driving wheels to the rotational speed of the driven wheel, second comparing means for comparing the output of the calculating means with a predetermined threshold slipping ratio, third comparing means for comparing the rotational speed of the driven wheel with a predetermined reference speed, and switching means for connecting the output of the first comparing means to the control means when the rotational speed of the driven wheel is lower than the predetermined reference speed and connecting the output of the second comparing means to the control means when the rotational speed of the driven wheel is higher than the predetermined speed. The switching means is changed by the output of the third comparing means. A method of controlling motor vehicle driving force also is disclosed.

14 Claims, 3 Drawing Figures

SYSTEM FOR CONTROLLING MOTOR VEHICLE DRIVING FORCE

BACKGROUND OF THE INVENTION

The present invention relates to a system and method for controlling the driving force of a motor vehicle, such as an automobile. More particularly, the invention relates to a system for maintaining motor vehicle driving force by controlling the rotational speed of the driving wheels to minimize slipping. The system is applicable to automobiles, trucks, tractors, and the like.

In conventional systems for controlling the driving force of a motor vehicle, a control characteristic value of the driving wheels, such as the slipping ratio or the rotational speed, is compared with a threshold level determined in accordance with the rotational speed of one or more of the driven wheels. The system controls a brake force applied to the driving wheels so that the control characteristic is maintained at a constant relationship with respect to the threshold level.

In the initial start of the vehicle on a slippery or a slithery road, however, the rotational speed of the driven wheels is extremely low while that of the driving wheels is high, and the variation in the difference in rotational speed between the driving and the driven wheels may be large. In other words, the slipping ratio is extremely large and may rapidly change. Accordingly, it is difficult to precisely control the brake system and to obtain a predetermined driving force when the slipping ratio is employed as the control characteristic in the low-speed range of the motor vehicle.

On the other hand, when the motor vehicle is in a high-speed range, the variation in the slipping ratio would be minimized as a variation of the rotational speed of the driving wheels relative to the driven wheels is minimized. During high-speed operation of the vehicle, since it is required to obtain a driving force with a high efficiency, that is, a low fuel-consumption rate, it is desirable to employ a slipping ratio as the control characteristic value which directly affects the driving force, rather than the rotational speed of the wheels, to control the system.

SUMMARY OF THE INVENTION

The present invention is intended to solve the above problems of conventional systems and it is therefore an object of the invention to provide a method and system for controlling driving force precisely with the best efficiency.

To achieve the foregoing objects and advantages, the system of the present invention comprises means for detecting the rotational speed of each of the driving wheels and at least one driven wheel, means for controlling brake means for the driving wheels according to the output of the detecting means, first comparing means for comparing the rotational speed of the driving wheels with the rotational speed of the driven wheel calculating means for determining a slipping ratio corresponding to the ratio of the rotational speed of the driving wheels to the rotational speed of the driven wheel, second comparing means for comparing the output of the calculating means with a predetermined threshold slipping ratio, third comparing means for comparing the rotational speed of the driven wheel with a first predetermined reference speed, and switching means for connecting the output of the first comparing means to the control means at times when the rotational speed of the driven wheel is lower than the first predetermined reference speed and for connecting the output of the second comparing means to the control means at times when the rotational speed of the driven wheel is higher than the first predetermined reference speed. The switching means is changed by the output of the third comparing means.

In the system for controlling the driving force for an automobile according to the invention, if the rotational speed of the driven wheel is lower than the predetermined reference speed, that is, in a low-speed range of the motor vehicle, the predetermined brake force is applied to a brake device by the control means to bring the rotational speed of the driving wheels close to that of the driven wheel, by comparing the rotational speed of the driving wheels with a second predetermined reference speed. If the rotational speed of the driven wheel exceeds the first predetermined reference speed, that is, in a high-speed range of the motor vehicle, the brake is controlled so as to bring the slipping ratio of the driving wheels with respect to the driven wheel close to about 10% of the value at on which the largest absorption between the tires of the motor vehicle and the road is attained. The result is that the driving force is controlled precisely with the best efficiency.

DETAILED DESCRIPTION OF THE PREFERRED EMBODIMENT

Figure 1:
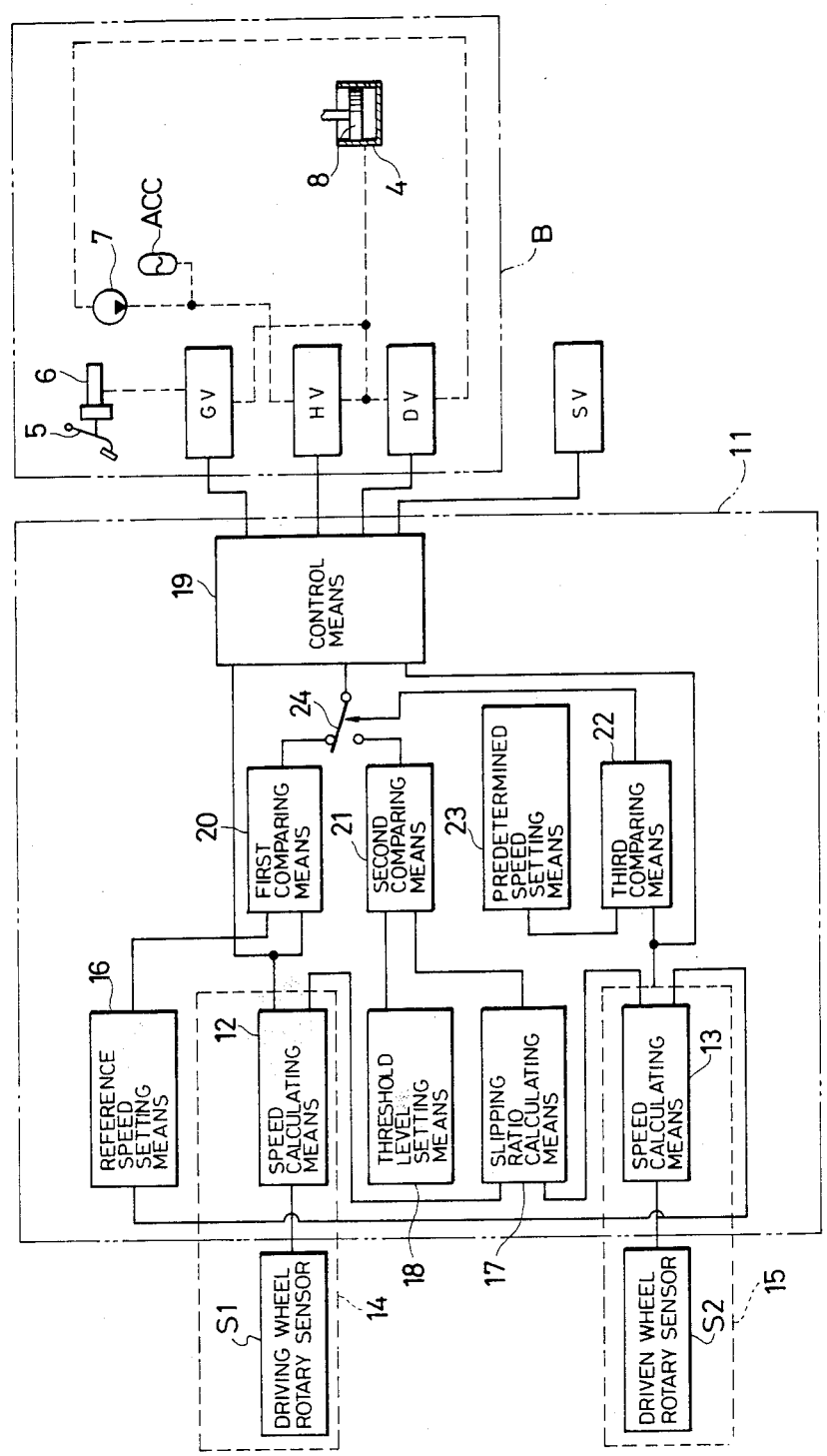
FIG. 1 is a block diagram showing the control circuit of an embodiment according to the present invention.
Figure 2:
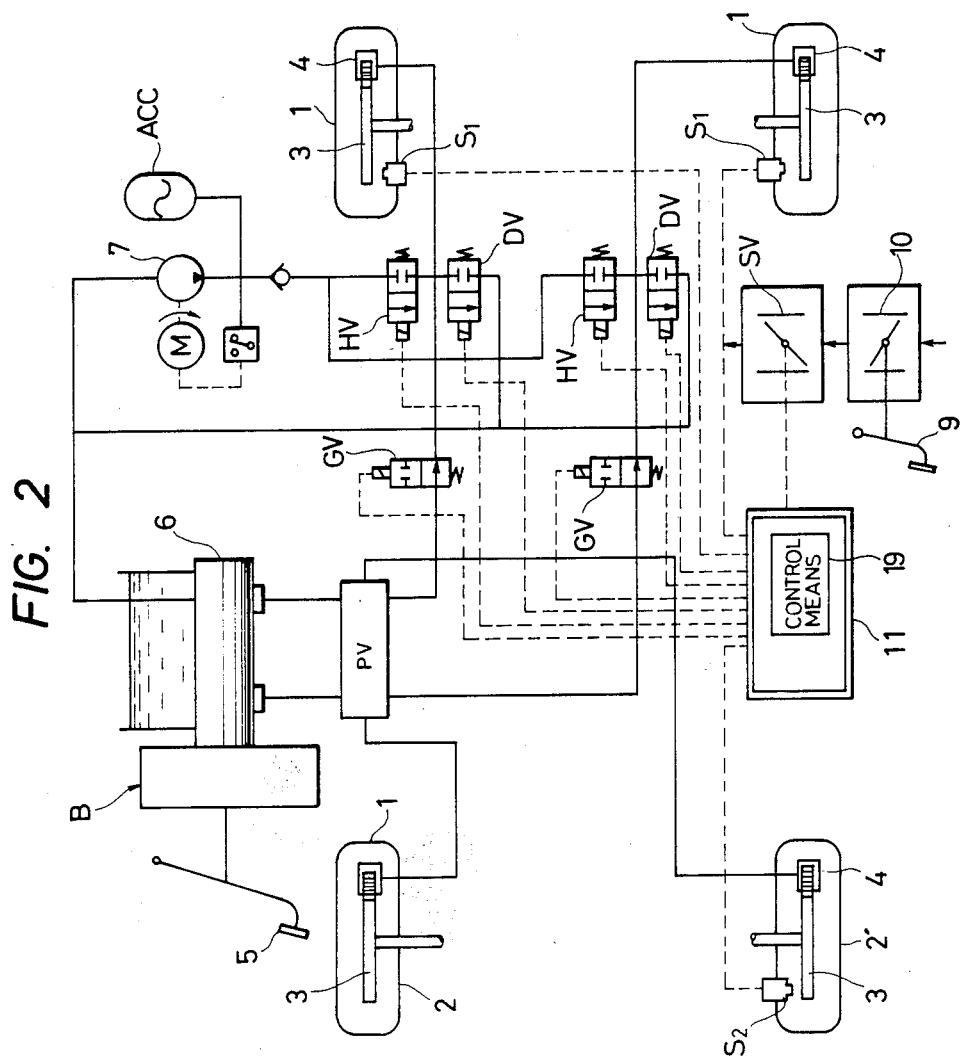
FIG. 2 shows a circuit diagram of a control system of the invention.

A preferred embodiment of the present invention will be described with reference to the accompanying drawings. FIG. 2 shows a circuit diagram of a system for controlling the driving force of the invention applied to an automobile as one example of a motor vehicle. FIG. 1 is a block diagram of the control circuit shown in FIG. 2. Braking force derived from a brake B acts on a pair of driving wheels 1, 1 and a pair of driven wheels 2, 2'. Each of wheels 1, 1, 2, 2' includes a rotor 3 fixed thereto. The illustrated brake B is such that hydraulic oil in a master cylinder 6 is supplied to brake cylinders 4, each of which corresponds to a rotor 3 of the wheels 1, 1, 2, 2' through a proportioning valve PV and gate valves GV. These valves are conventionally used when a brake pedal 5 is actuated, or when brake pistons 8 press brake shoes against the rotors 3 as hydraulic oil in an accumulator ACC is supplied through the opening or closing operation of hold valves HV and decay valves DV, described below.

The proportioning valve PV functions so that rising pressure rate of hydraulic oil supplied to each of the brake cylinders 4 may be changed. Opening the gate valve GV supplies hydraulic oil in the master cylinder 6 to the brake cylinder 4. Closing the gate valve GV stops supplying the oil Similarly, opening or closing of the hold valve HV controls the supply of hydraulic oil in the accumulator ACC stored by the pump 7. Operation of the decay valve DV controls the discharge of hydraulic oil in the brake cylinder 4.

In the system shown in FIG. 2, a fuel control valve 10 is operated by an acceleration control member 9. The opening amount of the fuel control valve 10 corresponds to the operating amount of the acceleration control member 9. The fuel is supplied to the engine through a throttle valve SV controlled as described below.

An example of the control means of the invention will subsequently be described.

A speed detecting means 14 comprises a rotary sensor S1 for detecting the number of revolutions of each driving wheel 1, 1 and a speed calculating means 12 provided in a microcomputer 11. The speed detecting means 14 outputs the rotational speeds $V_{Da}$ and $V_{Db}$ of the left and right driving wheels, repsectively. Similarly, a speed detecting means 15 comprises rotary sensor S2 for detecting the number of revolutions of one of the driven wheels 2' and a speed calculating means 13 provided in the microcomputer 11. The speed detecting means 15 outputs the rotational speed $V_T$ of the one driven wheel 2'. A reference speed setting means 16 provided in the microcomputer 11 outputs a predetermined reference speed $V_K$ which is derived by adding a constant speed value $V_1$ to the speed value $V_T$ of the one driven wheel 2'. Further, a slipping ratio S corresponding to the ratio of the rotational speed of the driving wheels 1, 1 to the rotational speed of the one driven wheel 2' is calculated by a slipping ratio calculating means 17, provided in the microcomputer 11, by using the speeds $V_{Da}$, $V_{Db}$ of the driving wheels and the speed $V_T$ of the one driven wheel. The slipping ratio S is derived by the formula $S=(V_D-V_T)/V_T$, where $V_D=V_{Da}$ or $V_{Db}$.

A slipping ratio threshold level Su as a reference slipping ratio of the driving wheels is determined by a slipping ratio threshold level setting means 18 provided in the microcomputer. A control means 19 provided in the microcomputer 11 for controlling the brake B controls the open/close operation of each of the gate valves GV, the hold valves HV, and the decay valves DV according to the comparison of the reference speed $V_K$ with the rotational speeds $V_{Da}$, $V_{Db}$ of the driving wheels during operation in a low-speed range, in which the rotational speed $V_T$ of the driven wheel is lower than a predetermined reference speed value $V_2$. Further, during operation in a high-speed range, in which the rotational speed $V_T$ of the driven wheel is higher than the predetermined reference speed $V_2$, the microcomputer 11 controls each of the above-described valves according to the difference between the slipping ratio S and the slipping ratio threshold level Su.

More specifically, first comparing means 20 compares the reference speed $V_K$ of the reference speed setting means 16 with the rotational speeds $V_{Da}$, $V_{Db}$ of the driving wheels. The output of the first comparing means 20 is inputted into the control means 19 through a switch 24. A second comparing means 21 compares the output of the slipping ratio calculating means 17 with the output of the slipping ratio threshold level setting means 18. The output of the second comparing means 21 is inputted into the control means 19 through the switch 24. Third comparing means 22 compares the predetermined reference speed $V_2$ outputted from a predetermined speed setting means 23 with the rotational speed $V_T$ of the driven wheel 2'. The third comparing means 22 controls the switch 24 in such a manner that when $V_T$ is equal to or less than $V_2$ the first comparing means 20 is connected to the control means 19, and when $V_T$ is larger than $V_2$ the second comparing means 21 is connected to the control means 19.

Figure 3:
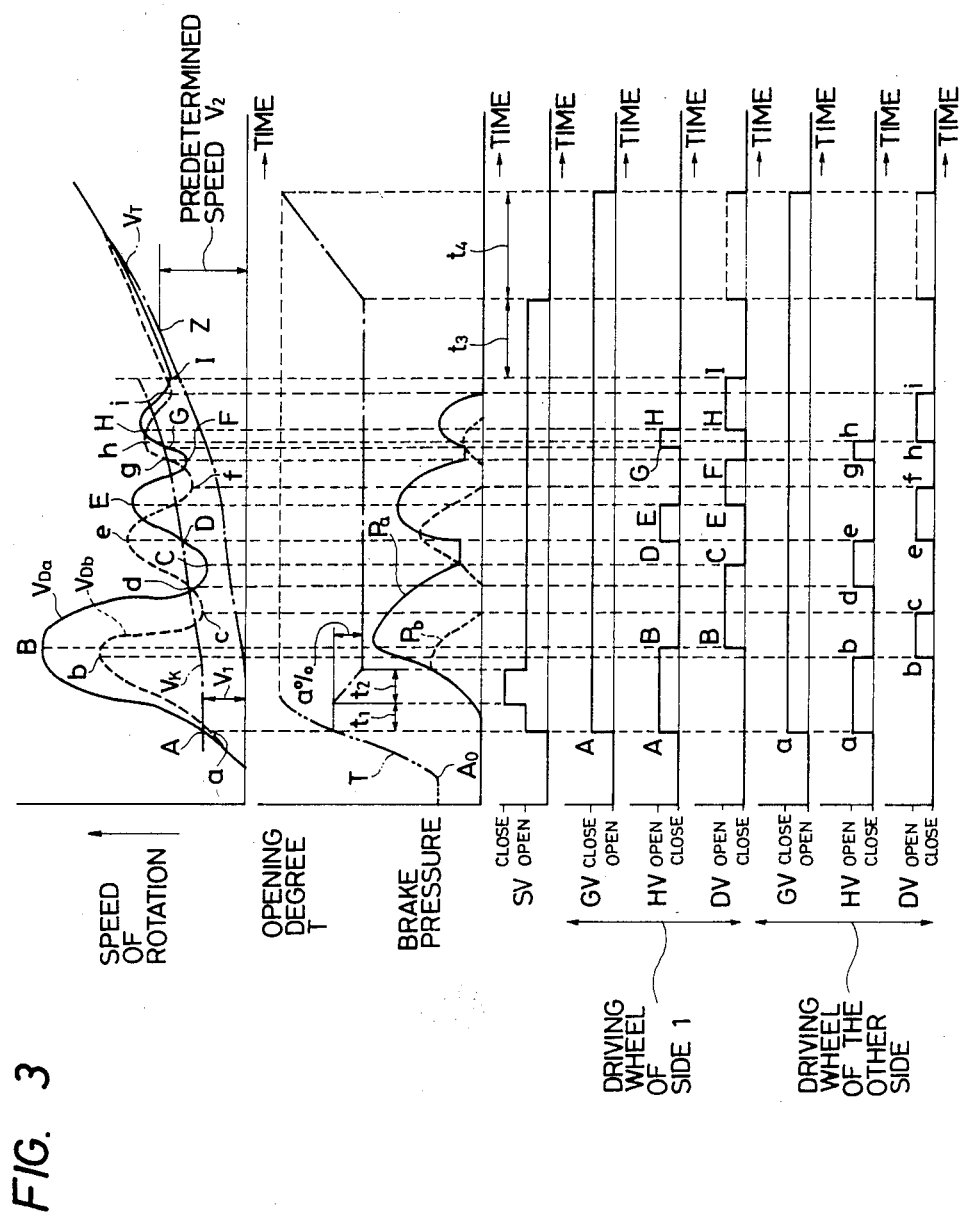
FIG. 3 is a diagram showing a control characteristics according to the present invention.

FIG. 3 shows the changes in the respective rotational speeds $V_{Da}$ and $V_{Db}$ of the left and right driving wheels 1, 1; increases and decreases in the respective brake pressures $P_a$ and $P_b$ within the brake cylinders 4, 4 of the left and right driving wheels 1, 1; and changes in the open/close state of the gate valves GV, the hold valves HV, and the decay valves DV.

In the ordinary state, the gate valves GV are open while the hold valves HV and the decay valves DV are closed. In this state, if the acceleration control member 9 is actuated at a point $A_0$, the throttle opening angle T of the throttle valve SV rises accordingly, so that the speeds of revolution of the driving wheels 1, 1 and the driven wheels 2, 2' become higher. At this time, the first comparing means 20 is connected to the control means 19 through the switch 24, because the rotation speed $V_T$ of the driven wheel 2' is lower than the predetermined reference speed $V_2$ immediately after the motor vehicle has started moving. The brake B is actuated when the rotational speed $V_{Da}$ of the left driving wheel 1 exceeds the reference speed $V_K$ at the point A shown in FIG. 3. In this operation, the brake pressures to the rotors 3 are compressed when the speed of the motor vehicle is increasing, and decompressed when the speed is decreasing. It is preferable to arrange that if the difference in rotational speed between the left and right driving wheels 1, 1 does not exceed a predetermined reference speed $V_0$, the same brake pressure is compressed to or decompressed from both the driving wheels 1, 1 at the same time, and that if the difference in rotational speed exceeds the predetermined speed $V_0$, the brake pressure is compressed to the driving wheel having the higher rotational speed and decompressed from the one having the lower rotational speed.

The operation of the brake system of the invention will be described in detail.

In the example shown in FIG. 3, the rotational speed $V_{Da}$ of the left driving wheel 1 becomes higher than speed $V_{Db}$ of the right driving wheel 1. When the rotational speed $V_{Da}$ reaches the reference speed $V_K$ at the point A shown in FIG. 3, the throttle opening angle T is held by the throttle valve SV to control the torque of the engine of the motor vehicle, and at the same time the brake is controlled. If the difference in the rotational speeds $V_{Da}$ and $V_{Db}$ is less than the predetermined reference speed $V_0$, the gate valves GV close and the hold valves HV open for both of the driving wheels 1, 1 so that both the brake pressures Pa and Pb are increased. If the difference between $V_{Da}$ and $V_{Db}$ exceeds the predetermined reference speed $V_0$, the gate valve GV closes and the hold valve GV opens only for the left driving wheel to increase the brake pressure $P_a$.

By using the above-described braking operation which is applied only to the driving wheel having the higher speed, the system of the present invention thus arranged can eliminate a problem of conventional systems, in which the brake pressure is applied to both driving wheels even if the difference in speed between the left and right wheels is relatively small. One problem of conventional systems may be an excessive slipping due to the changes in rotational speed between the left and right driving wheels during the brake operation.

If the rotational speed $V_{Da}$ of the left driving wheel 1 or the rotational speed $V_{Db}$ of the right driving wheel 1 continues to increase after a predetermined time period $t_1$ from the point A, the throttle opening angle T is decreased by $\alpha$ % and then the throttle opening angle T is held. When the rotational speed $V_{Db}$ of the right driving wheel, which is lower than that of the left driving wheel but exceeds the reference speed $V_K$, reaches a maximum at the point b and starts to decrease, the hold valve HV closes and the decay valve DV opens so as to decrease the brake pressure $P_b$. Further, instead of the decompressing operation described above, the holding operation can be controlled so that the decay valves DV open for a short time period after the hold valves HV close. When the rotational speed $V_{Da}$ of the left driving wheel, which is higher than speed $V_{Db}$ of the right driving wheel, reaches its maximum point at the point B shown in FIG. 3 and begins to decrease, the hold valve HV of the left driving wheel closes and the decay valve opens to decrease the brake pressure $P_a$. When the rotational speed $V_{Db}$ of the right driving wheel is lower than speed $V_{Da}$ of the left driving wheel and is lower than the reference speed $V_K$ to be minimized at the point c, both the hold valves HV and the decay valves DV close so that the brake pressure $P_b$ is held. Next, the rotational speed $V_{Db}$ of the right driving wheel increases to reach the reference speed $V_K$ at the point d. In this state, if the difference between the rotational speed $V_{Da}$ of the left driving wheel and the rotational speed $V_{Db}$ of the right driving wheel exceeds the predetermined reference speed $V_0$, the hold valve HV of the right driving wheel opens and the decay valve DV closes to increase the brake pressure $P_b$. If the difference is less than $V_0$, the hold valves HV of both the driving wheels open and the decay valves DV close to increase both $P_a$ and $P_b$. When the rotational speed $V_{Da}$ of the left driving wheel is minimized at the point C, both the hold valves HV and the decay valves DV close and brake pressure $P_a$ is held. While the speeds of both the left and right driving wheels are increasing until the next maximum points after their speeds of revolution $V_{Da}$ and $V_{Db}$ have reached the reference speed $V_K$ (that is, D-E, G-H and d-e, g-h in FIG. 3), the hold valves HV and the decay valves DV are maintained in the open and closed states, respectively. While the speeds of revolution $V_{Da}$ and $V_{Db}$ are decreasing from a maximum point to a subsequent minimum point, that is, during a deceleration of the respective driving wheel (B-C, E-F, H-I and b-c, e-f, h-i in FIG. 3), the hold valves HV are kept closed and the decay valves DV are kept open.

When the rotational speed $V_T$ of the driven wheel 2' increases to reach the predetermined reference speed $V_2$ at a point Z, the switch 24 is changed by the output of the third comparing means 22 so that the second comparing measn 21 is connected to the control means 19. After that, the rotational speeds of the driving wheels are not controlled in accordance with the difference between the rotational speeds $V_{Da}$, $V_{Db}$ and reference speed $V_K$. Instead, the rotational speeds of the driving wheels are controlled by comparing the slipping ratio threshold level Su and the slipping ratio S of the speed of the driving wheels 1, 1 with respect to the speed of the driven wheel 2'.

An embodiment of controlling the slipping ratio of the invention will now be described.

When the slipping ratio S is less than the slipping ratio threshold level Su, the hold valves HV close and the decay valves DV open so that the brake pressure decreases. In contrast, when the slipping ratio S is larger than the slipping ratio threshold level Su, the hold valves HV open and the decay valves DV close so as to increase the brake pressure. When the slipping ratio S is equal to the slipping ratio threshold level Su, both the hold valves HV and the decay valves DV close so as to hold the brake pressure constant. The above-described operations in the brake B are controlled by the control means 19. After a predetermined time period $t_3$ has passed from a point I at which both the hold valves HV and the decay valves DV close, the slipping in the acceleration of the driving wheels is deemed to be extinguished. The decay valves DV repeat the open-and-close operation during a predetermined time period $t_4$ so that the pressure oil is completely exhausted little by little. At the same time, the throttle opening angle T of the throttle valve SV increases for a moment, and after that the gate valves GV are controlled to open by the control means 19.

On the above-described system of the invention, the reference speed $V_K$ is employed to control the brake pressure. However, it can be applicable to a system in which two, that is, high and low reference speeds are employed. Further, it also can be applicable to employ two slipping ratios in the system of the invention. A rotary sensor of an electric generator type may be employed as the speed detecting means 14 and/or 15 and the brake B may be an air brake.

In the system for controlling the driving force for an automobile of the invention, as described above, if the rotational speed $V_t$ of the driven wheel 2' is lower than the predetermined speed $V_2$, that is, in a low-speed range, the predetermined brake force is applied to the brake B by the control means 19 to bring the rotational speed of the driving wheels 1, 1 close to that of the driven wheel 2', by comparing the rotational speed of the driving wheels 1, 1 with the reference speed $V_K$. If the rotational speed $V_T$ of the driven wheel 2' exceeds the predetermined speed $V_2$, that is, in the high-speed range, the brake B is controlled so as to bring the slipping ratio S of the driving wheels 1, 1 with respect to the driven wheel 2' close to about 10% of the value at which the larges absorption between the tires of the motor vehicle and the road is attained. The result is that the driving force is controlled precisely with the best efficiency.

What is claimed is:

1. A method of controlling motor vehicle driving force for a motor vehicle having a right driving wheel, a left driving wheel, and at least one driven wheel, the method comprising the steps of:
   detecting the rotational speeds of said driving wheels and said driven wheels;
   comparing the rotational speed of said driven wheel with a first predetermined reference speed;
   a first braking step, performed at times when the rotational speed of said driven wheel is less than or equal to said first predetermined reference speed, of decelerating said driving wheels when the rotational speed of said driving wheels exceeds a second predetermined reference speed;
   determining a slipping ratio corresponding to the ratio of the rotational speed of said driving wheels to the rotational speed of said driven wheel; and
   a second braking step, performed at times when the rotational speed of said driven wheel is greater than said first predetermined reference speed, of decelerating said driving wheels when the slipping ratio exceeds a predetermined threshold slipping ratio.

2. The method of claim 1, wherein said second predetermined reference speed is the sum of the rotational speed of said driven wheel and a predetermined constant.

3. The method of claim 1, wherein said first and second braking steps include applying a brake to each of said driving wheels.

4. The method of claim 3, wherein said first braking step further includes decreasing the torque of the engine of said motor vehicle at times when the rotational speed of either of said driving wheels increases for a predetermined period of time after said brakes are applied.

5. The method of claim 1, wherein said first braking step includes:
   applying a brake to each of said driving wheels when the difference in rotational speed of said two driving wheels is less than or equal to a third predetermined reference speed; and
   applying a brake to said driving wheel having the higher rotational speed when the difference in rotational speed of said two driving wheels is greater than said third predetermined reference speed.

6. The method of claim 5, wherein said first braking step further includes decreasing the torque of the engine of said motor vehicle at times when the rotational speed of either of said driving wheels increases for a predetermined period of time after one of said brakes is applied.

7. The method of claim 1, wherein said first braking step includes applying a brake to each of said driving wheels only when the rotational speed of said respective driving wheel is increasing.

8. The method of claim 1, wherein said slipping ratio between the rotational speed of said driving wheels and the rotational speed of said driven wheel is equal to $(V_D - V_T)/V_T$, where $V_D$ is the rotational speed of said driving wheels and $V_T$ is the rotational speed of said driven wheel.

9. A system for controlling motor vehicle driving force for a motor vehicle having a left driving wheel, a right driving wheel, and at least one driven wheel, the system comprising:
   means for detecting the rotational speed of each of said driving wheels and said driven wheel;
   brake means for decelerating each of said driving wheels upon activation;
   control means responsive to said detecting means for selectively activating said brake means;
   first comparing means for comparing the rotational speed of said driving wheels with the rotational speed of said driven wheels;
   calculating means for determining a slipping ratio between the rotational speed of said driving wheels and the rotational speed of said driven wheel;
   second comparing means responsive to said calculating means for comparing the slipping ratio determined by said calculating means with a predetermined threshold slipping ratio;
   third comparing means for comparing the rotational speed of said driven wheel with a first predetermined reference speed; and
   switch means responsive to said third comparing means for connecting said first comparing means to said control means at times when the rotational speed of said driven wheel is less than or equal to said first predetermined reference speed and for connecting said second comparing means to said control means at times when the rotational speed of said driven wheel is greater than said first predetermined reference speed.

10. The system of claim 9, wherein said control means:
    activates said brake means when said rotational speed of said driving wheels exceeds a second predetermined reference speed at times when said control means is connected to said first comparing means; and
    activates said brake means when said slipping ratio exceeds said predetermined threshold slipping ratio at times when said control means is connected to said second comparing means.

11. The system of claim 10, further comprising reference speed setting means for generating said second predetermined reference speed by adding a constant speed value to said rotational speed of said driven wheel, and wherein said first comparing means is responsive to said reference speed setting means and compares the rotational speed of said driving wheels to said second predetermined reference speed.

12. The system of claim 9, wherein said detecting means includes:
    a rotary sensor mounted adjacent each of said driving wheels and said driven wheel for detecting the number of revolutions of each of said driving wheels and said driven wheel; and
    means responsive to each of said rotary sensors for calculating the rotational speed of each of said driving wheels and said driven wheel.

13. The system of claim 9, wherein said brake means includes:
    a master brake cylinder for supplying hydraulic fluid;
    an accumulator in flow communication with said master brake cylinder;
    means for pumping hydraulic fluid from said master brake cylinder to said accumulator;
    a hydraulic brake mounted proximate each of said driving wheels and in flow communication with said accumulator for applying a frictional braking force to said respective driving wheel; and
    valve means responsive to said control means for selectively increasing, decreasing, or maintaining the pressure of the hydraulic fluid supplied to said hydraulic brakes.

14. The system of claim 13, wherein said valve means includes a hold valve and a decay valve in flow communication with each of said hydraulic brakes.

* * * * *